(12) United States Patent
Miaoyi et al.

(10) Patent No.: US 11,142,056 B2
(45) Date of Patent: Oct. 12, 2021

(54) TRUCK BED COVER

(71) Applicants: Lai Miaoyi, Foshan (CN); Shun Kit Tam, Pico Rivera, CA (US)

(72) Inventors: Lai Miaoyi, Foshan (CN); Shun Kit Tam, Pico Rivera, CA (US)

(73) Assignee: JCWIN AUTO CORP, Pico Rivera, CA (US)

( * ) Notice: Subject to any disclaimer, the term of this patent is extended or adjusted under 35 U.S.C. 154(b) by 151 days.

(21) Appl. No.: 16/404,251

(22) Filed: May 6, 2019

(65) Prior Publication Data

US 2020/0353805 A1 Nov. 12, 2020

(51) Int. Cl.
*B60J 11/02* (2006.01)
*B60J 7/06* (2006.01)
*B60J 11/06* (2006.01)

(52) U.S. Cl.
CPC ............ *B60J 11/025* (2013.01); *B60J 7/068* (2013.01); *B60J 11/06* (2013.01); *B60Y 2200/14* (2013.01)

(58) Field of Classification Search
CPC .......... B60J 11/025; B60J 11/06; B60J 7/068; B60Y 2200/14
USPC ........................................................ 296/98
See application file for complete search history.

(56) References Cited

U.S. PATENT DOCUMENTS

| | | | |
|---|---|---|---|
| 5,330,246 A * | 7/1994 | Bernardo | B60J 7/068 160/130 |
| 5,636,893 A | 6/1997 | Wheatley et al. | |
| 5,752,791 A | 5/1998 | Ehrlich | |
| 5,906,407 A | 5/1999 | Schmeichel | |
| 5,934,849 A | 8/1999 | Haire | |
| D434,361 S | 11/2000 | Block et al. | |
| 6,857,683 B2 | 2/2005 | Myers | |
| 7,188,888 B2 | 3/2007 | Wheatley et al. | |
| 7,484,788 B2 | 2/2009 | Calder et al. | |
| D620,877 S | 8/2010 | Rusher et al. | |
| 8,061,758 B2 | 11/2011 | Maimin et al. | |
| 8,182,021 B2 | 5/2012 | Maimin et al. | |
| 8,672,388 B2 | 3/2014 | Rusher et al. | |
| 8,690,224 B2 | 4/2014 | Maimin et al. | |
| 9,399,391 B2 | 7/2016 | Bernardo et al. | |
| 10,137,766 B2 * | 11/2018 | Bernardo | B60J 7/041 |
| 2016/0280123 A1 * | 9/2016 | Rohr | B60J 7/067 |

* cited by examiner

*Primary Examiner* — Joseph D. Pape
*Assistant Examiner* — Dana D Ivey
(74) *Attorney, Agent, or Firm* — Averill & Green; Kenneth L Green

(57) ABSTRACT

A truck bed cover includes rails attached along truck bed side tops, slats residing laterally between the rails, end caps attached to opposite ends of each slat sliding forward and rearward in the rails, and flexible joiner hinges attaching consecutive ones of the slats. A cover holder resided between truck sides against a truck cab. The cover slides into the holder for storage, and rolls into a spiral inside the holder. Each slat includes two end walls and a center wall. The center wall includes a center "C" shaped portion and vertical portions reaching up from the center "C" shaped portion to a slat top surface and down from the center "C" shaped portion to a slat bottom surface. The slat top is cambered to reduce or eliminate water pooling on the cover.

18 Claims, 4 Drawing Sheets

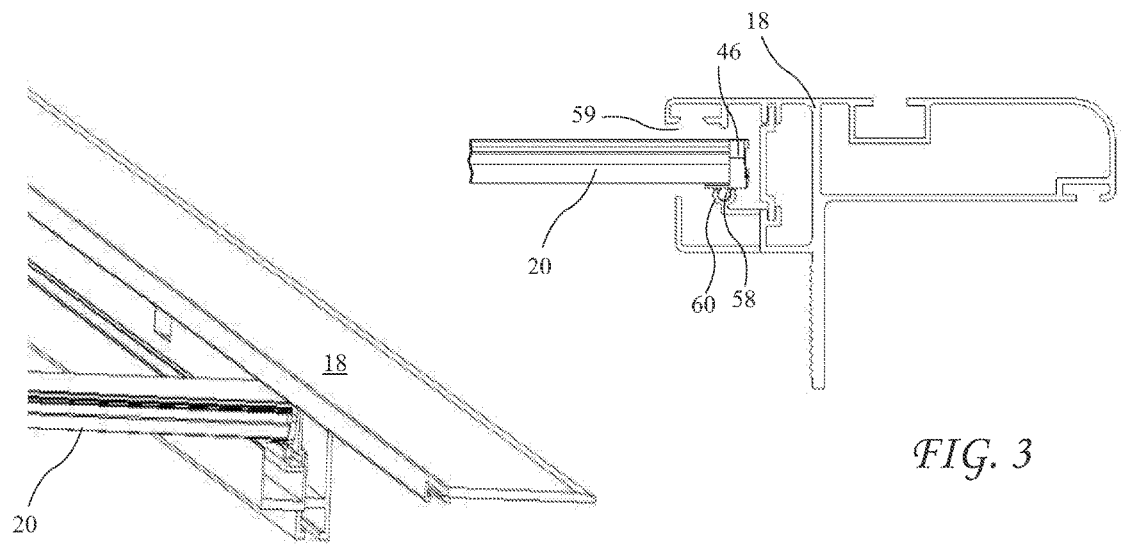
FIG. 2
FIG. 3
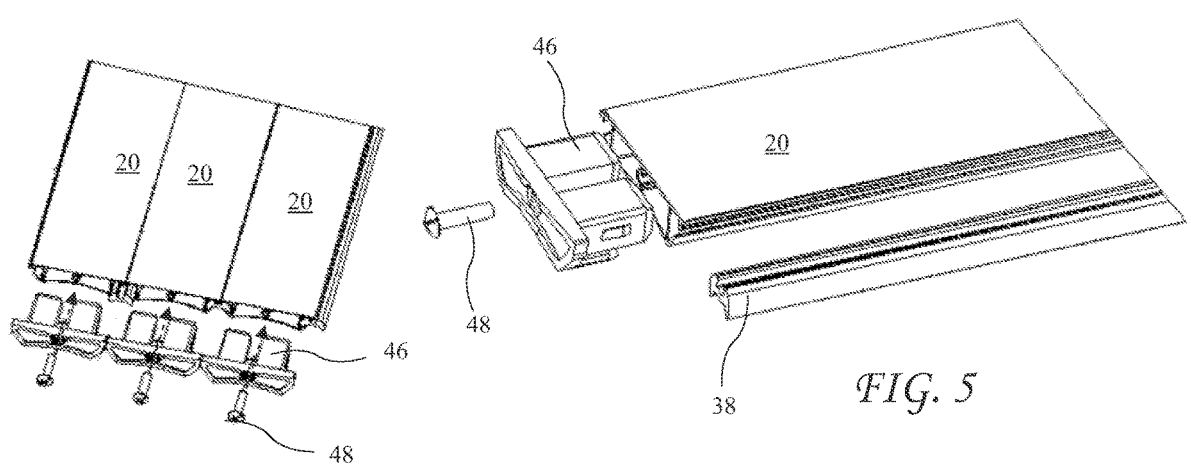
FIG. 4
FIG. 5

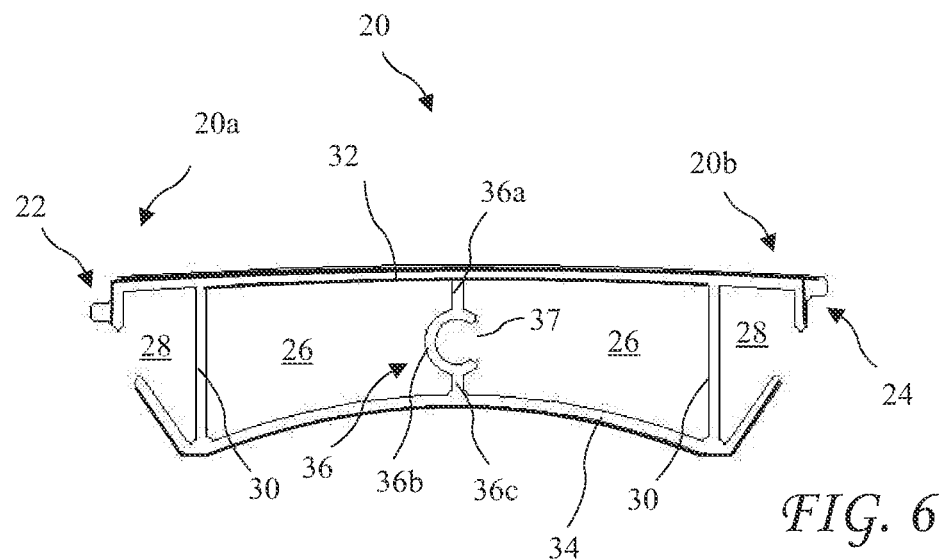
FIG. 6
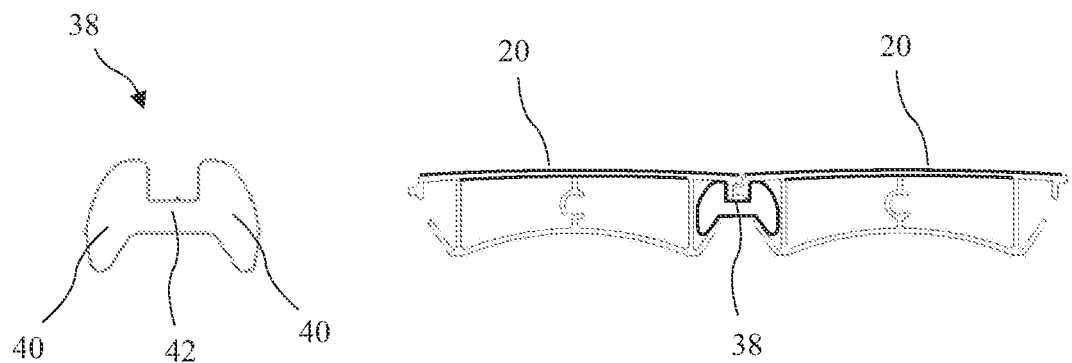
FIG. 7
FIG. 8

US 11,142,056 B2

TRUCK BED COVER

BACKGROUND OF THE INVENTION

The present invention relates to truck bed covers and in particular to a cover that rolls up inside a housing residing against a truck cab, and includes a durable light weight structure.

Small trucks are commonly owned for both private and commercial use. Users commonly store both material and tools in truck beds and are often not able to continuously monitor the trucks for theft of items left in the truck beds. The users often install a truck bed cover to secure the items left in the truck beds to reduce theft. Unfortunately, known truck bed covers are often heavy and bulky when stored.

BRIEF SUMMARY OF THE INVENTION

The present invention addresses the above and other needs by providing a truck bed cover which includes rails attached along truck bed side tops, slats residing laterally between the rails, end caps attached to opposite ends of each slat sliding forward and rearward in the rails, and flexible joiner hinges attaching consecutive ones of the slats. A cover holder resided between truck sides against a truck cab. The cover slides into the holder for storage, and rolls into a spiral inside the holder. Each slat includes two end walls and a center wall. The center wall includes a center "C" shaped portion and vertical portions reaching up from the center "C" shaped portion to a slat top surface and down from the center "C" shaped portion to a slat bottom surface. The slat top is cambered to reduce or eliminate water pooling on the cover.

In accordance with one aspect of the invention, there is provided a truck bed cover having light weight, high strength slats. The slats include a middle wall having a center "C" shaped portion and vertical portions reaching up from the center "C" shaped portion to a slat top surface and down from the center "C" shaped portion to a slat bottom surface. The center "C" shaped portion economizes manufacturing and facilitates tight attachment of the cap ends using screws entering the "C" shaped portion allowing longer engagement of the screws. The "C" shape is also tolerant of thermal expansion and contraction which is important in a product exposed to the environment. Structural analysis showed that without the middle wall a slat substantially deformed from a 20N load design specification, and adding the middle wall reduced the deformation to an acceptable level.

In accordance with another aspect of the invention, there is provided a truck bed cover having slat end caps sliding on hard inserts in rails. The rails are preferably aluminum and the hard inserts are preferably steel, and more preferably stainless steel.

In accordance with yet another aspect of the invention, there is provided a truck bed cover housing residing between truck sides against a truck cab, and not substantially higher than the deployed cover. The cover is pushed forward and guided to roll up inside the housing. When the cover is deployed, the cover and housing create a substantially flat surface above the truck bed, maximizing cargo carrying area for cargo laying flat on the truck bed.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 shows perspective view of a slat and end cap of the truck bed cover engaging a side rail according to the present invention.

FIG. 3 shows a cross-sectional view of the slat and the end cap of the truck bed cover engaging a side rail according to the present invention.

FIG. 4 perspective view of three consecutive end caps and slats according to the present invention.

FIG. 5 shows a perspective view of the end cap, the slat, and a flexible joiner member according to the present invention.

FIG. 6 shows a cross-sectional view of the slat according to the present invention.

FIG. 7 shows a cross-sectional view of the flexible joiner member according to the present invention.

FIG. 8 shows a cross-sectional view of consecutive slats connected by the flexible joiner member according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
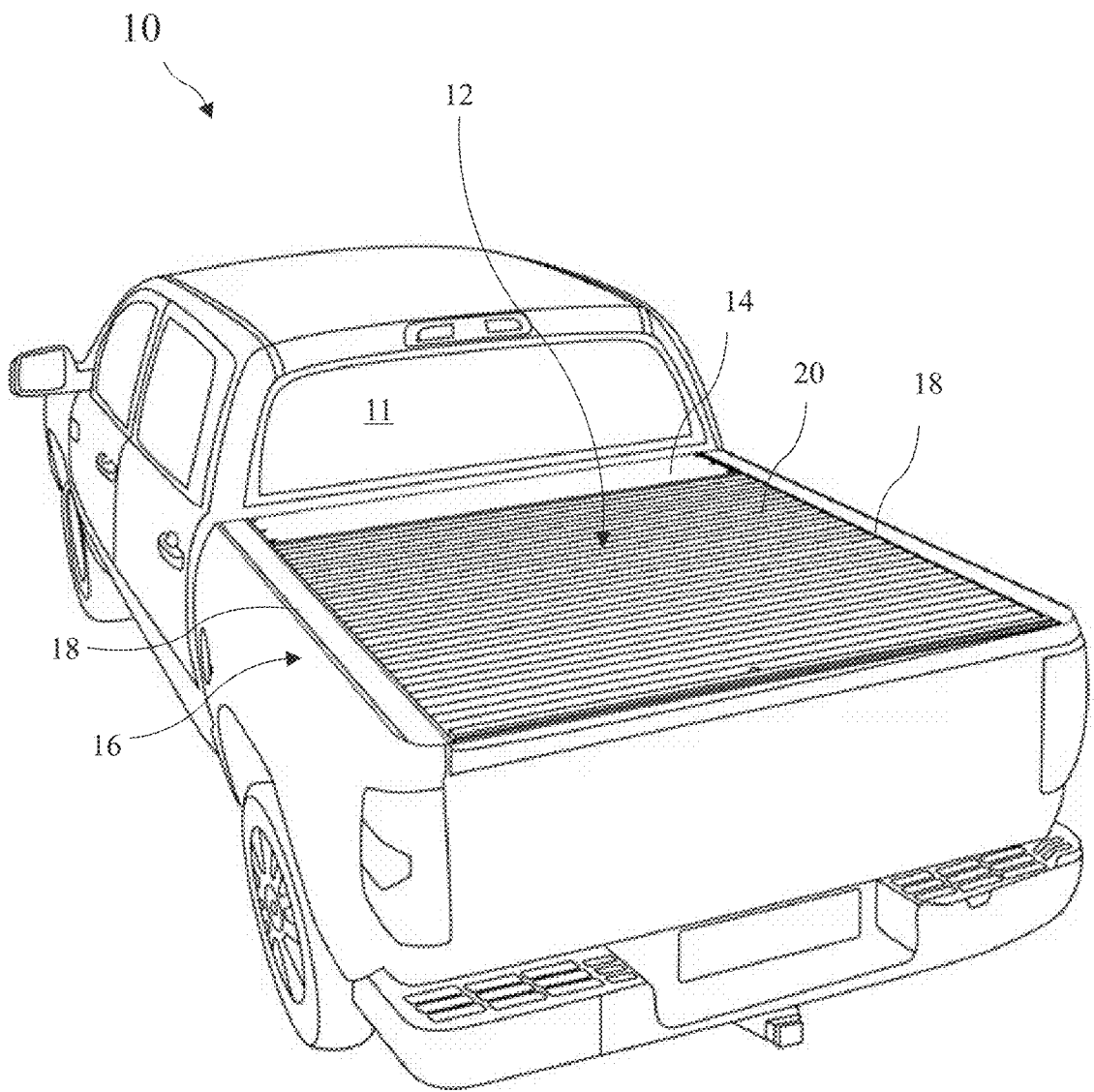
FIG. 1 shows a truck and truck bed cover according to the present invention.

A truck 10 and truck bed cover 12 according to the present invention is shown in FIG. 1. The cover 12 slides between rails 18 attached to truck bed side tops 16. The cover 12 is composed of a series of slats 20 which may be pushed into and withdrawn from a cover housing 14 residing against a truck cab 11. The top of the housing 14 is even with the slats 20 or slightly higher than the slats 20 providing a flat surface up to the cab 11. The slats 20 are preferably made from aluminum.

A perspective view of a slat 20 and end cap 46 engaging the side rail 18 is shown in FIG. 2, and a cross-sectional view of slat 20 and the end cap 46 engaging the side rail 18 though a mouth 59 is shown in FIG. 3. A sliding surface 54 (see FIGS. 8-10) of the end cap 46 slides on an insert 58 held in an insert groove 60. The insert 58 is preferably a hard insert, and more preferably a hard metal insert, and most preferably a stainless steel insert. The insert 58 may be polished to reduce sliding friction.

A perspective view of three consecutive end caps 46 and slats 20 is shown in FIG. 4 and a perspective view of the end cap 46, the slat 20, and a flexible joiner member 38 is shown in FIG. 5. One of the end caps 46 is attached to each slat 20 by a fastener 48. The fastener 48 is preferably a screw engaging the "C" shaped center middle wall 36 (see FIG. 6) of each slat 20, and more preferably a stainless steel screw, for example, 304 stainless steel. Each joiner member 38 engages consecutive slats 20 to connect the slats.

A cross-sectional view of the slat 20 is shown in FIG. 6. The slat 20 includes a front side 20a, a rear side 20b, end walls 30 and the middle wall 36 reaching between a top surface 32 and bottom surface 34. The middle wall 36 includes a center "C" shaped portion 36c and vertical portion 36a reaching up from the center "C" shaped portion 36b to the slat top surface 32 and vertical portion 36c down from the center "C" shaped portion 36b to the slat bottom 34. The center "C" shaped portion 36b includes a rearward facing opening 37 having top and bottom lips 37a and 37b partially closing the opening 37. Chambers 26 are defined between the middle wall 36 and the end walls 30 and connector channels 28 are defined outside the end walls 30. A rearward end 24 is at the right end of the top surface and an overlapping forward end 22 is at the opposite left end of the top surface 32. The "C" shaped center portion of the middle wall improves and economizes the manufacturing process, and facilitates tight attachment of the cap ends 30 to the slats 20.

A cross-sectional view of the flexible joiner member 38 is shown in FIG. 7 and a cross-sectional view of consecutive slats 20 connected by the flexible joiner member 38 is shown in FIG. 8. The flexible joiner member 38 includes a center 42 and two connector ports 40. The connector portions 40 engage the connector channels 28 of consecutive slats 20 to connect the slats 20. The center 42 allows the slats 20 to move sufficiently to coil within the holder 14 (see FIG. 12).

Figure 9:
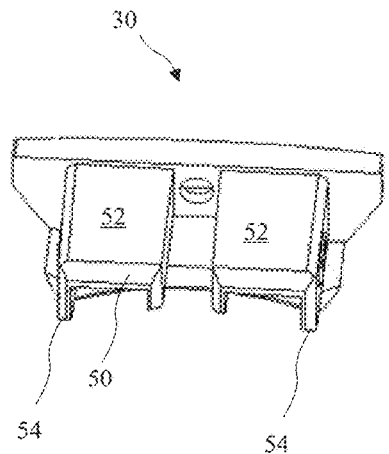
FIG. 9 shows a perspective inner and top view of the end cap according to the present invention.
Figure 10:
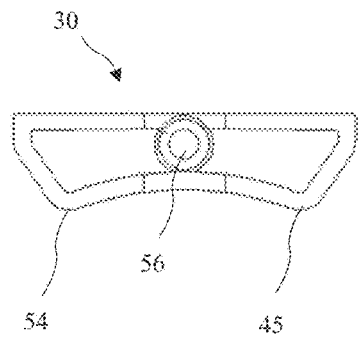
FIG. 10 shows an outer end view of the end cap according to the present invention.
Figure 11:
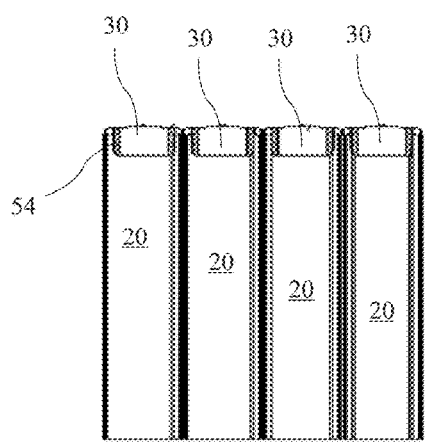
FIG. 11 shows a bottom view of the slats and the end cap according to the present invention.

A perspective inner and top view of the end cap 30 is shown in FIG. 9, an outer end view of the end cap 30 is shown in FIG. 10 and a bottom view of the slats 20 and the end caps 30 is shown in FIG. 11. The end cap 30 includes inserts 52 which enter the chambers 26 (see FIG. 6) of the slats 20, the inserts 52 including tapers 50 to facilitate engaging the chambers 26. Sliding surfaces 54 slide on the inserts 58 in the rails 18. The end caps 46 are preferably plastic, and more preferably Polyoxymethylene and the sliding surfaces 54 are preferably polished to reduce friction. The fastener 44 passes through a passage 56 to attach the end caps 30 to the slats 20.

Figure 12:
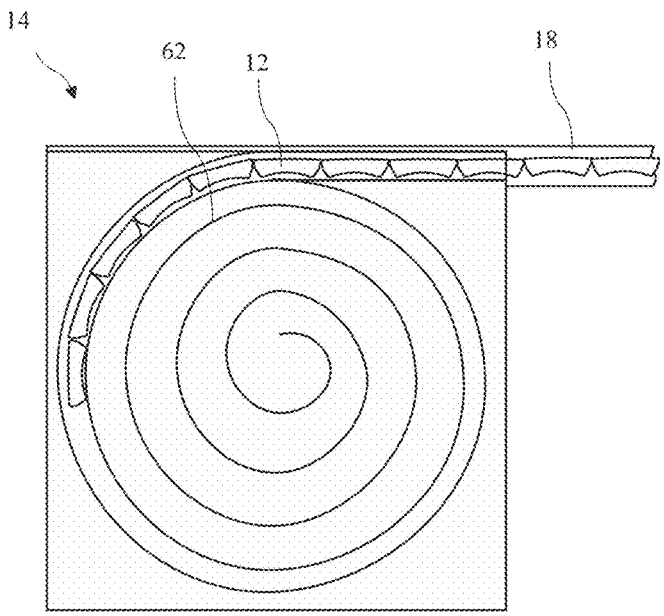
FIG. 12 is a cross-sectional view of the cover coiling in a cover holder.

A cross-sectional view of the holder 14 and cover 12 is shown in FIG. 12. The holder 14 includes spiral guides 62 to guide the cover 12 into the holder. A rear most slat 20 of the cover 12 includes a lip to prevent the cover entering too far onto the holder and to extract the cover 12 from the holder 14.

While the invention herein disclosed has been described by means of specific embodiments and applications thereof, numerous modifications and variations could be made thereto by those skilled in the art without departing from the scope of the invention set forth in the claims.

We claim:

1. Truck bed cover comprising:
   rails configured to attach along truck bed side tops;
   a multiplicity of slats residing laterally between the rails and slidably engaging the rails;
   end caps attached to opposite ends of each slat, the end caps cooperating with the rails to slide forward and rearward in the rails;
   flexible joiner hinges attaching consecutive ones of the slats; and
   a cover holder configured to reside between truck sides proximal to a truck cab,
   a holder interior receiving the truck bed cover for storage, wherein the slats slide between the rails into the cover holder for storage, and the slats withdraw from the cover holder to cover the truck bed; and
   the slats including;
      a laterally running front side;
      a laterally running rear side, the front side offset from the rear side towards the truck cab;
      a slat top surface reaching horizontally between the front side and rear side; and
      a laterally running, and vertically reaching, center wall between the front side and the rear side and reaching down from the slat top surface.

2. The truck bed cover of claim 1, wherein the center wall is generally centered between the front side and rear side.

3. The truck bed cover of claim 2, further including:
   a front connecting channel proximal to the front side;
   a rear connecting channel proximal to the rear side, the connecting channels receiving the flexible joiner hinges connecting adjacent slats;
   a slat bottom surface under the slat top surface and reaching between the connecting channels.

4. The truck bed cover of claim 3, wherein the center wall connects the top surface to the bottom surface.

5. The truck bed cover of claim 4, wherein the center wall is generally centered between the front side and the rear side.

6. The truck bed cover of claim 5, wherein:
   the center wall include a center portion; and
   the end caps are attached to the slats by a fastener engaging the center portion of the center wall.

7. The truck bed cover of claim 1, wherein the end caps are attached to the slats by a fastener engaging the center wall.

8. The truck bed cover of claim 1, wherein the joiner members are a dog bone shape with sides engaging consecutive slats and center section in tension when the consecutive slats are attached by the joiner members, drawing the slats together and resisting water passing between consecutive slats.

9. The truck bed cover of claim 1, wherein:
   the center wall include a center portion; and
   the end caps are attached to the slats by a fastener engaging the center portion of the center wall.

10. The truck bed cover of claim 9, wherein the center portion comprises a generally round cross-section "C" shaped center portion.

11. The truck bed cover of claim 10, wherein the "C" shaped center portion comprises:
    a continuous bottom, top, and first side; and
    a partially open second side opposite to the first side and having a top lip and a bottom lip partially closing the second side.

12. A truck bed cover comprising:
    rails configured to attach along truck bed side tops;
    a multiplicity of slats residing consecutively and reaching laterally between the rails and slidably engaging the rails, the slats comprising:
       a laterally running front side;
       a laterally running rear side, the front side offset from the rear side towards the truck cab;
       a slat top surface of each slat;
       a slat bottom surface of each slat below the slat top surface;

laterally running and vertically reaching end walls proximal to front and rear sides of each slat connecting the bottom surface to the top surface;

laterally running and vertically reaching center walls between the end walls and connecting the top surface to the bottom surface of each slat; and the center walls include laterally running "C" shaped center portions open to one side and vertical portions reaching up from the center portion to the slat top surface and down from the center portion to the slat bottom surface;

end caps attached to opposite ends of each slat, the end caps cooperating with the rails to slide forward and rearward in the rails, the end caps attached to each slat through the "C" shaped center portion of each slat;

flexible joiner hinges attaching consecutive ones of the slats; and a cover holder configured to reside between truck sides proximal to a truck cab, a holder interior receiving the truck bed cover for storage, wherein the slats slide between the rails into the cover holder for storage, and the slats withdraw from the cover holder to cover the truck bed.

13. The truck bed cover of claim 12, wherein the center wall is generally centered between the end walls.

14. The truck bed cover of claim 12, wherein the "C" shaped center portion comprises a continuous bottom, first side, and top, and partially open second side having a top lip and a bottom lip partially closing the second side.

15. A truck bed cover comprising:

rails configured to attach along truck bed side tops;

a multiplicity of slats residing consecutively and reaching laterally between the rails and slidably engaging the rails, the slats including:
 a slat top surface;
 a laterally running front side;
 a laterally running rear side, the front side offset from the rear side towards the truck cab;
 laterally running and vertically reaching end walls proximal to the front and rear sides of each slat, the end walls reaching down from the slat top surface; and
 a laterally running and vertically reaching center wall between the end walls, the center walls include a center portion configured to receive a fastener and including a vertical portion reaching up from the center portion to the slat top surface;

end caps attached to opposite ends of each slat by a fastener engaging the center portion, the end caps cooperating with the rails to slide forward and rearward in the rails;

flexible joiner hinges attaching consecutive ones of the slats; and a cover holder configured to reside between truck sides proximal to a truck cab, a holder interior including spiral guides for receiving the truck bed cover for storage, wherein the slats slide between the rails into the cover holder for storage, and the slats withdraw from the cover holder to cover the truck bed.

16. The truck bed cover of claim 15, wherein the center wall is generally centered between the end walls.

17. The truck bed cover of claim 15, further including:
a bottom surface under the top surface;
end walls proximal to front and rear sides of each slat connecting the bottom surface to the top surface; and
the center portion connected to the bottom surface.

18. The truck bed cover of claim 15, wherein:
the joiner members are a dog bone shape with sides engaging consecutive slats and center section in tension when the consecutive slats are attached by the joiner members, drawing the slats together and resisting water passing between consecutive slats; and
the joiner members engage connector channels at the front and rear sides of each slat, the connector channels defined by laterally running and vertically reaching end walls proximal to front and rear sides of each slat connecting the bottom surface to the top surface, and upward and outward reaching lips from the bottom surface towards the top surface, leaving open gaps in the front side and the rear side for the joiner members to pass through.

* * * * *